United States Patent
Lai

(10) Patent No.: US 6,252,182 B1
(45) Date of Patent: Jun. 26, 2001

(54) DIGITAL PRESSURE SENSITIVE ELECTROMAGNETIC PEN

(75) Inventor: I-Lun Lai, Taipei (TW)

(73) Assignee: Aiptek International Inc., Hsinchu (TW)

( * ) Notice: Subject to any disclaimer, the term of this patent is extended or adjusted under 35 U.S.C. 154(b) by 0 days.

(21) Appl. No.: 09/306,147

(22) Filed: May 6, 1999

(51) Int. Cl.[7] .................................................. G06K 11/18
(52) U.S. Cl. ........................................ 178/19.04; 345/179
(58) Field of Search ........................... 73/862.69; 178/18; 345/179

(56) References Cited

U.S. PATENT DOCUMENTS 5,565,632 * 10/1996 Ogawa ............................... 73/862.69
5,581,052 * 12/1996 Padula et al. ........................... 178/18

\* cited by examiner

Primary Examiner—Steven Saras
Assistant Examiner—Srilakshmi Kumar

(57) ABSTRACT

A digital pressure sensitive electromagnetic pen for writing and drawing on a touchpad is disclosed. The digital pressure sensitive pen comprising a pen core extending through a coil, a clamp casing, into a pen core support where the pen core is secured within a polygonal notch. The pressure sensitive pen further comprises a fixing casing inside which a conductible rubber, a coil circuit board, and an elastic element are placed. On the coil circuit board, spiral circuit arrangement is printed on the side facing toward the conductible rubber. The other side of the coil circuit board is connected to a processing board. When the pen is not used, there is no contact between the conductible rubber and the coil circuit board. When the pen of the present invention is used, there is writing force exerted on the pen core which moves the pen core support upwards and consequently pushes the conductible rubber against the coil circuit board and deforms the rubber. Different writing force results in different deformation of the rubber as well as different contact area and contact length between the conductible rubber and the coil circuit board. Such a contact area and a contact length can result in different value of resistance, which can be further processed by the processing board to generate different voltage output. Utilizing those voltage outputs, variation of line width can be presented on a display device. After finishing writing or drawing, there is no writing force exerted on the pen core. The elastic element exerts elastic force on the pen core support and moves it back to the unactuated position so as to avoid contact between the conductible rubber and the coil circuit board. Hence, no voltage output is present.

8 Claims, 6 Drawing Sheets

DIGITAL PRESSURE SENSITIVE ELECTROMAGNETIC PEN

FIELD OF THE INVENTION

The present invention relates to computer input devices such as digitizers or tablets and more particularly to a method and apparatus for generating variable width lines using pressure sensitive techniques or simulation thereof.

BACKGROUND OF THE INVENTION

Currently, the widely used computer input devices include keyboard and mouse. Due to the advance of the digital technologies, more and more computer users start to work with digitizer based devices such as digitizers or tablets which allow a user to write and draw upon the surface of a touchpad and have the signals and codes interpreted by a computer. Specifically, the touchpad provides a writing surface for capturing the position and the orientation of an object. In cooperation with the touchpad, a pen-like device is required to create such objects. Most existing pen-like devices, which can be corded or cordless, are not able to generate lines with variable width. To overcome this shortage, pressure sensitive pens are invented. In general, the existing pressure sensitive pens are classified into three categories: 1) capacitive pen, 2) resistive pen, and 3) dual iron-core inductive pen.

No matter which kind of pressure sensitive pen is employed to produce lines with variable width, the basic idea of pressure sensitive techniques is to utilize the variation of the pressure detected. When a resistive pen is used, the pressure variation is difficult to be felt and to be controlled by a user since the working stroke is too short. Consequently, it is difficult to directly present variable thickness of lines using a resistive pen. Capacitive type of pens suffer from similar problems. Dual iron-core inductive pens seem able to overcome the problem and generate lines with variable width. However, the dual iron-core inductive pens have their own drawbacks such as high cost, low production rate.

Based on the findings of the aforementioned drawbacks, it is therefore desirable to introduce an improved method and apparatus to control the pressure variation easily so as to directly present different thickness of lines when a user writes or draws on the surface of a touchpad.

SUMMARY OF THE INVENTION

It is known that the resistance of an element varies proportionally with the resistivity of the material and the element length, is inversely proportional to the cross section area of the element. Utilizing these properties, in accordance with the present invention, a resistive pressure sensitive electromagnetic pen is invented to solve the problems of short strokes and pressure variation control, so as to directly present different thickness of lines when writing or drawing.

An object of the present invention is to provide a resistive pressure sensitive pen comprising a pen core and a clamp casing. Inside the clamp casing, there is an offset space where a conductible rubber and a coil circuit board are placed. Further, in correspondence with the conductible rubber, spiral circuit is printed on the surface of the coil circuit board. When the pen is used, pressure force is exerted on the pen core, which presses the conductible rubber against the coil circuit board. Different levels of pressure result in different contact lengths and contact areas, consequently, different values of resistance which can be used to present different width of lines.

Another object of the present invention is to provide a pressure sensitive pen comprising a pen core support. On one end of the pen core support, there is a polygonal notch. Utilizing the friction between the sides of the notch and the pen core, the pen core can be secured within the polygonal notch appropriately.

Yet a further object of the present invention is to provide a pressure sensitive pen having an elastic element. The elastic element can move the pen core support to its unactuated position to avoid contact between the conductible rubber and the coil circuit board when the pressure sensitive pen is not used. Hence, no errors would occur.

The foregoing has outlined rather broadly the objects and technical advantages of the present invention. These and other objects and advantages of the present invention will become more apparent from a consideration of the following detailed description of a preferred embodiment thereof, when read in conjunction with the accompanying drawings, wherein:

DETAILED DESCRIPTION OF THE PREFERRED EMBODIMENT

Figure 1:
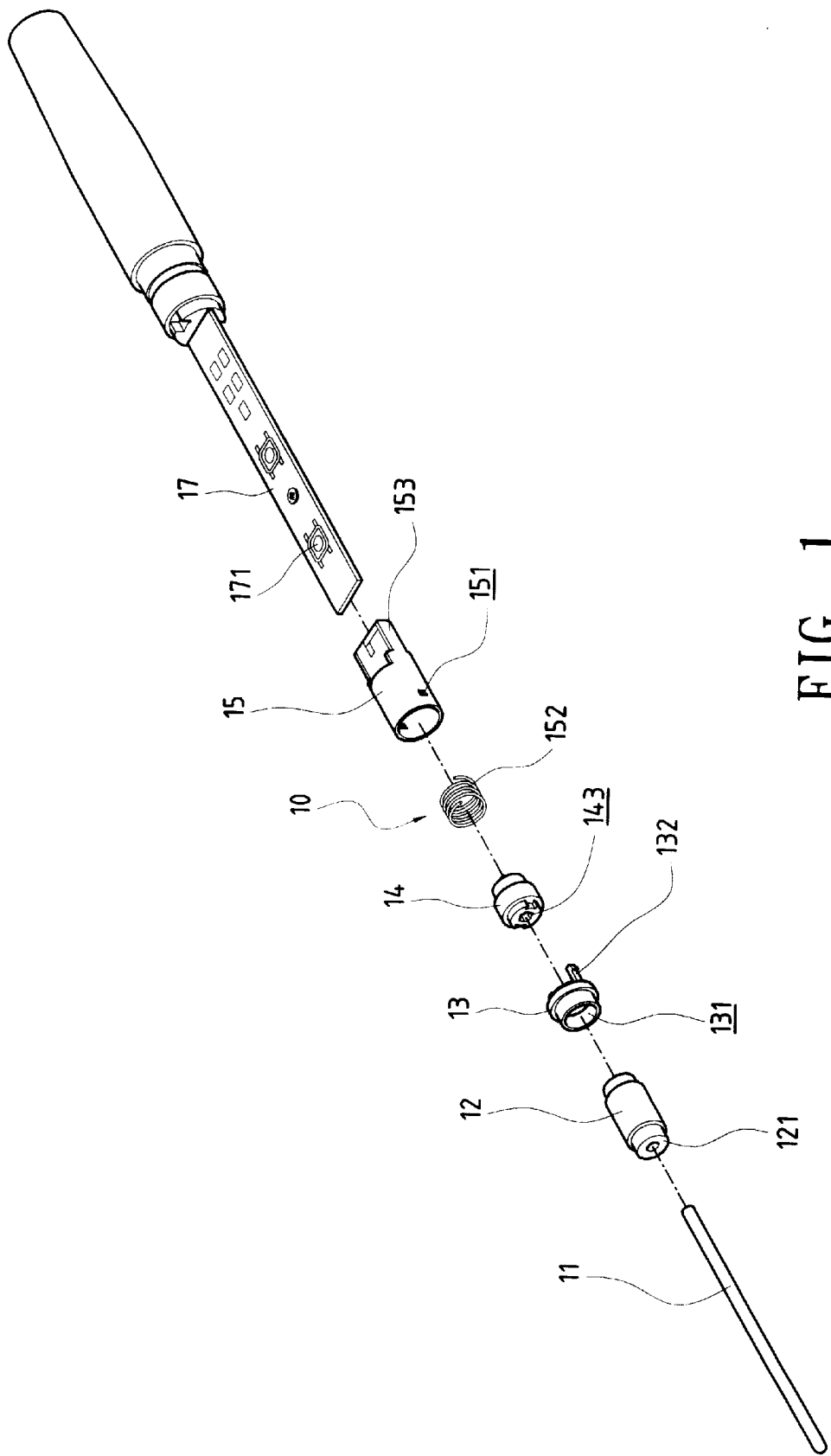
FIG. 1 shows all parts of the embodiment in the present invention.
Figure 4:
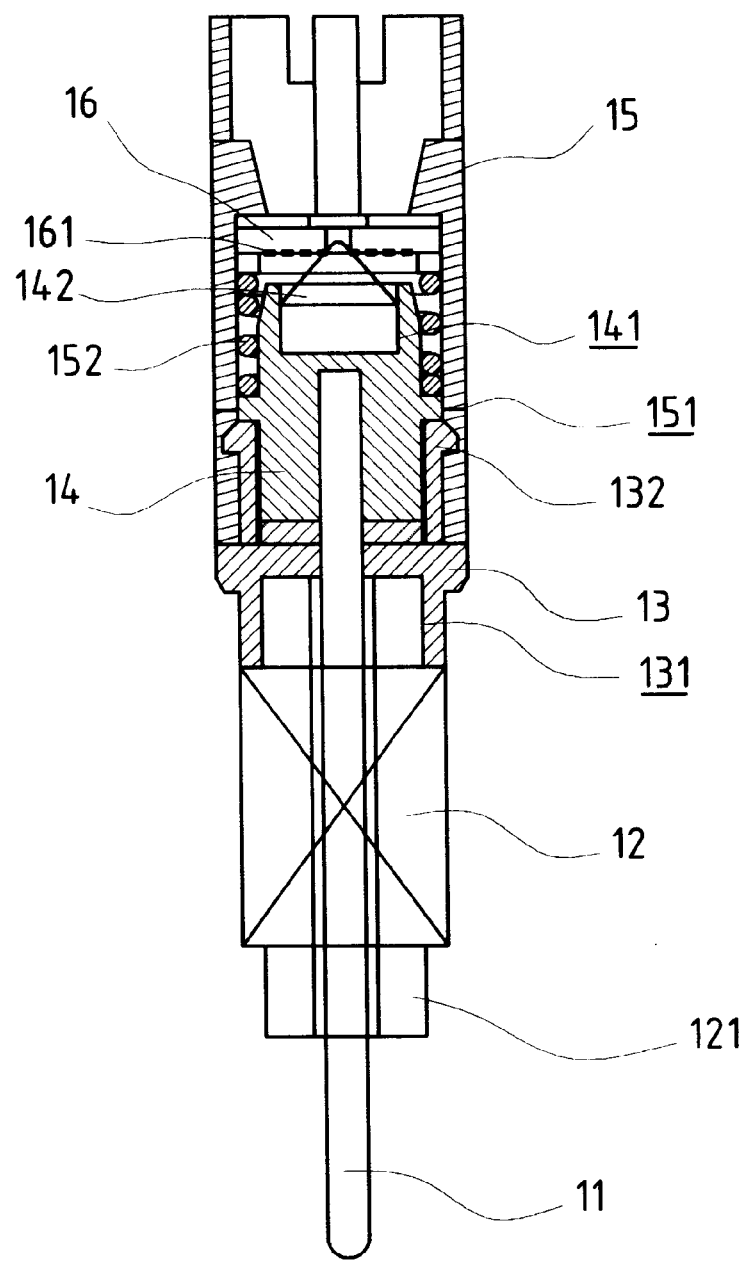
FIG. 4 shows an assembled system of the present invention in its initial condition.

Referring to FIGS. 1 and 4, an embodiment of a pressure sensitive electromagnetic pen has a replaceable pen core 11 for writing or drawing and a coil 12. In the front end of the coil 12, there is an iron powder core 121. In accordance with the present invention, the coil 12 incorporated with the iron core 121 serves as an oscillator to emit electromagnetic waves. To secure the coil 12, a clamp casing 13 is applied. The clamp casing has a notch 131 in the front end and two clamping hooks 132 in the other end thereof. The pressure sensitive pen further comprises a pen core support 14 with a space 141 where a conductible rubber 142 is placed inside. The conductible rubber 142 has a conic shape and deforms corresponding to the force exerted thereon. In the end opposite to the space 141, there is a polygonal notch 143 to secure the pen core 11.

In the present illustrated embodiment, the pen core 11 extends through the iron core 121, the clamp casing 13, and into the notch 143. Utilizing the friction force between the sides of the notch 143 and the pen core 11, the pen core 11 is secured in an appropriate position.

Figure 2:
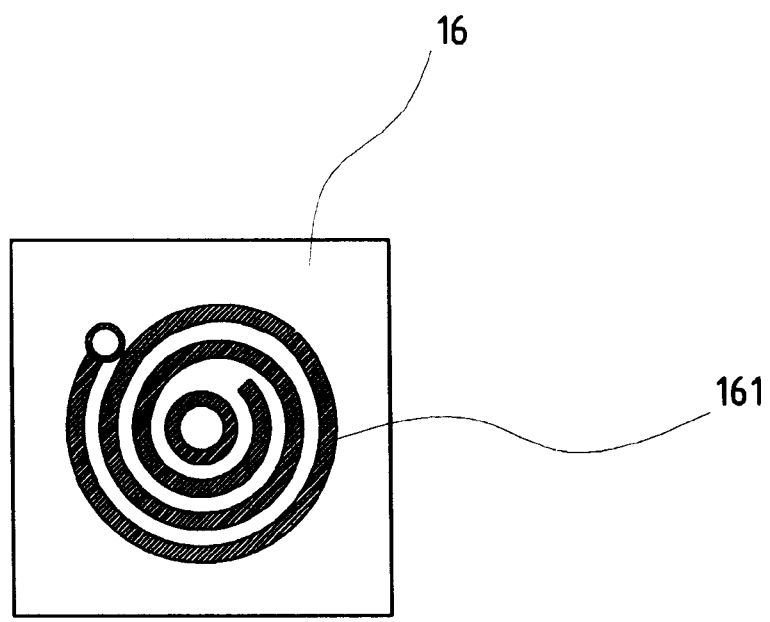
FIG. 2 shows a spiral circuit arrangement on the coil circuit board presented in FIG. 1.
Figure 3:
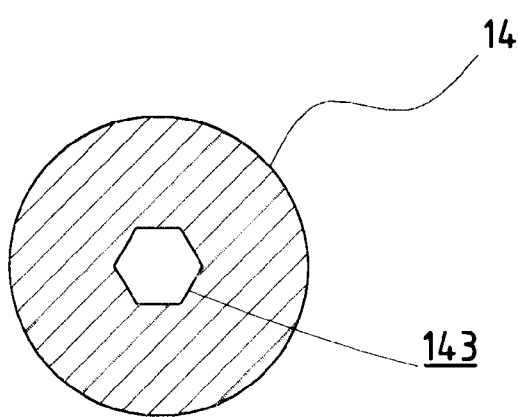
FIG. 3 shows a top view of the polygonal notch presented in FIG. 1.

Inside a fixing casing 15 having two holes 151 corresponding to the hooks 132, the pen core 11, an elastic element 152, and a coil circuit board 16 are placed. A spiral circuit arrangement 161 shown in FIG. 2 is printed on one side of the circuit board 16, which faces toward the rubber 142. The other side of the board 16 is connected to a processing board 17 that is placed on a plate 153 extending from the casing 15. The tasks of the processing board 17 are to generate different voltage outputs in correspondence with the resistance obtained from the board 16 and to transmit the electromagnetic writing signals to a touch pad not shown in the figures. Besides, on the board 17, there are two switches 171 used to for position selecting and confirming respectively. Hence, the pressure sensitive pen can also perform the functionality of a computer mouse.

Figure 5:
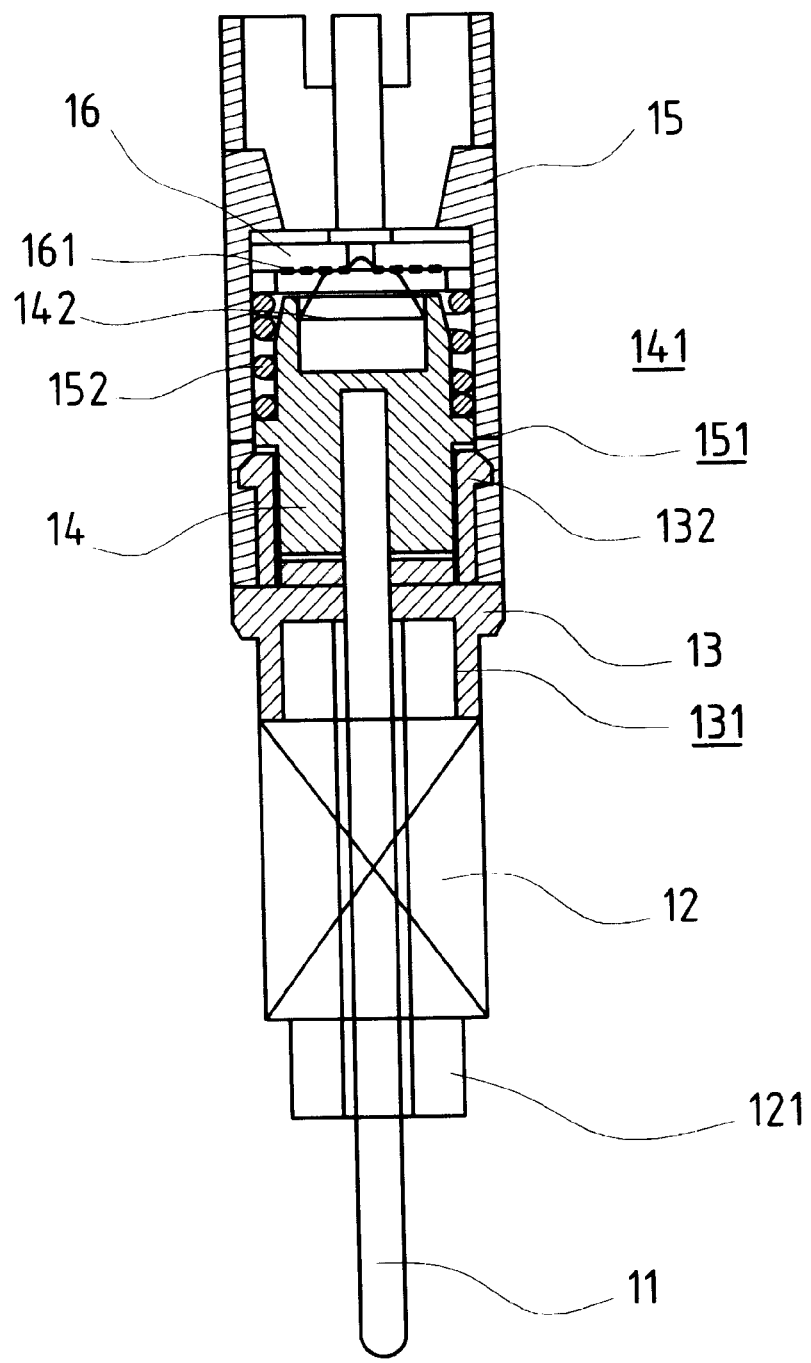
FIG. 5 shows an example of the system of the present invention being used.
Figure 6:
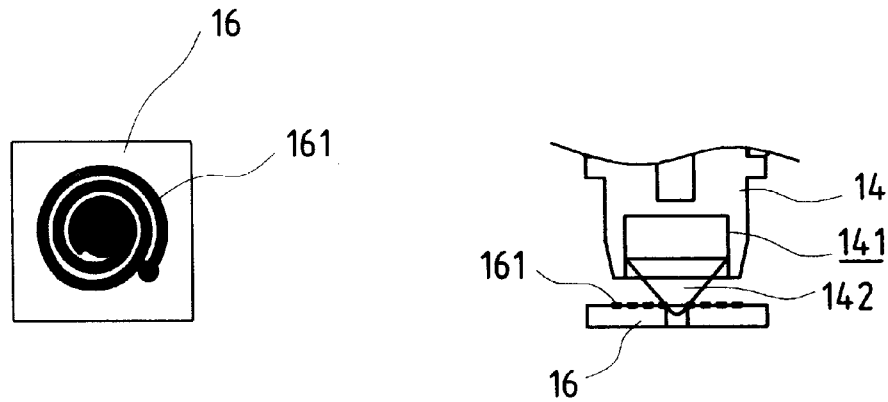
FIGS. 6A–6C show examples of different contact areas due to different writing forces.
Figure 6:
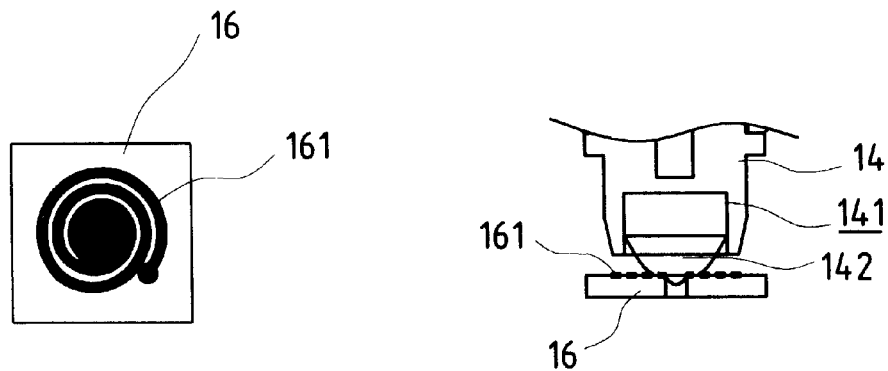
Figure 6:
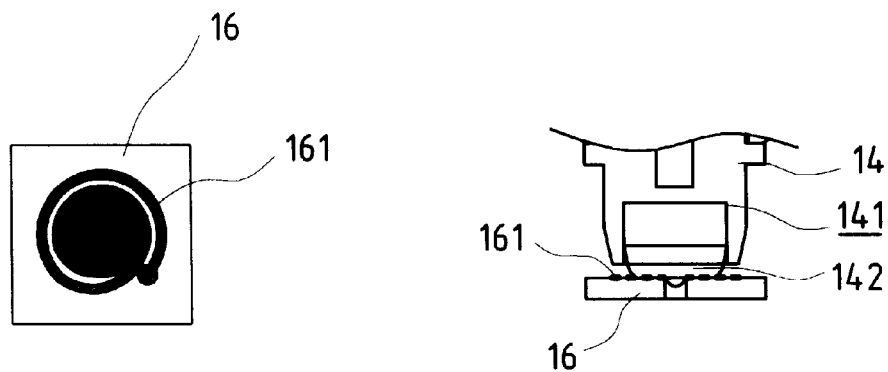

FIG. 5 shows an example of how the pressure sensitive pen works. When a user use the pressure sensitive to write or draw on a toughpad, writing force will be exerted on the pen core 11, which moves the pen core support upwards so as to push the conductible rubber 142 and against the circuit board 16. Different forces result in different levels of deformation of the rubber 142, consequently, different contact lengths and contact areas between the rubber 142 and the board 16. Different writing force examples are presented in FIGS. 6A–6C. FIG. 6A shows an example of small writing force. The black area depicts the aforementioned contact area denoted by A. Corresponding to the area A, there is a circuit length L. According to the theory of resistance, the resistance resulted from the contact between the conductible rubber 142 and the board 16 varies proportionally to the resitivity of the rubber 142 and the contact length L. However, the resulting resistance is inversely proportional to the contact area A. Different contact area A along with different length L due to different writing force lead to different value of resistance.

With the resulting resistance being sensed by the board 17, different corresponding voltage output can be obtained to present the variation of the line width.

Figure 7:
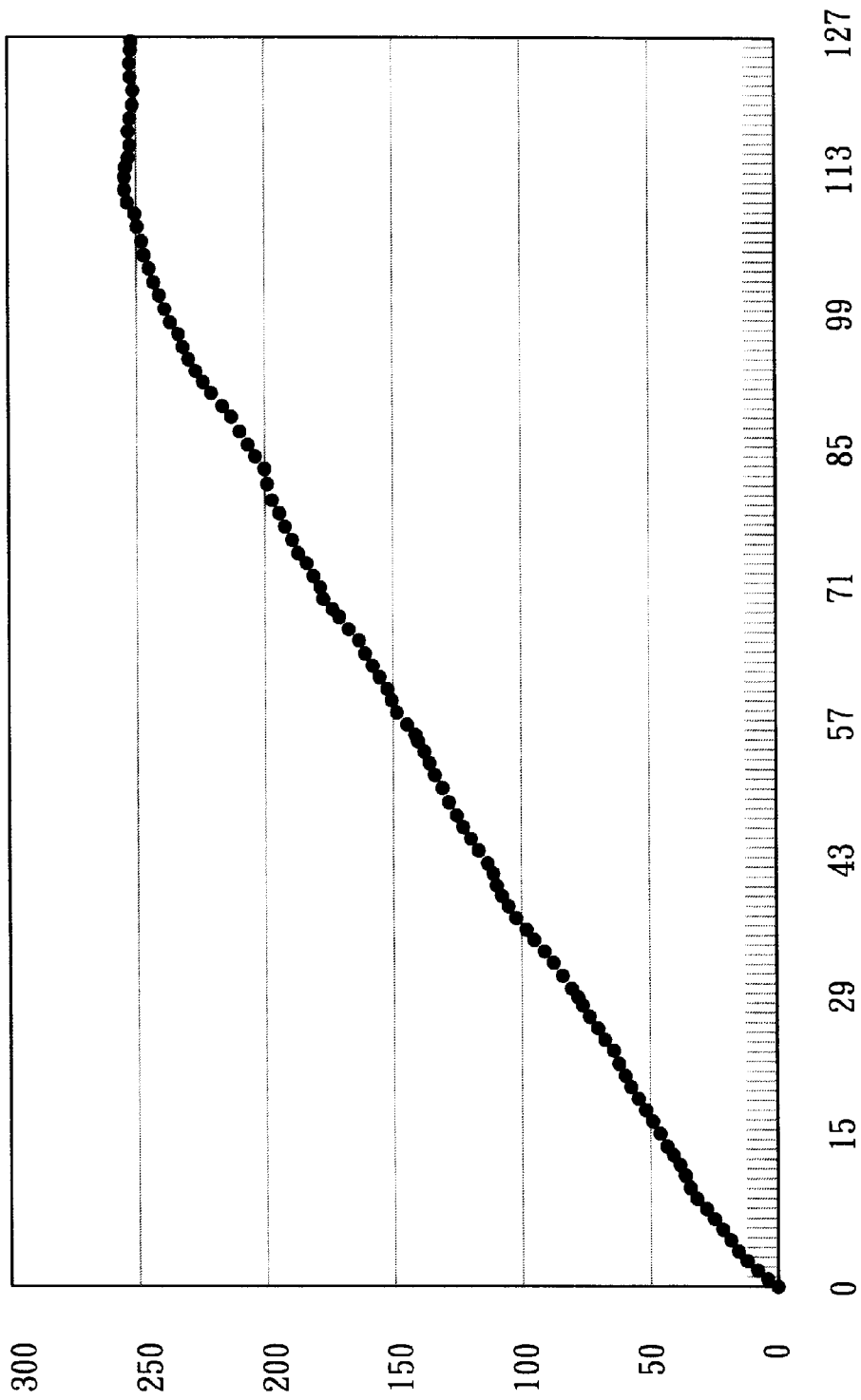
FIG. 7 is a chart of input-output relation.

Let us now refer to FIG. 4. After finishing writing or drawing, there is no writing force exerted on the pen core 11 as well as the elastic element 152. Hence, the element 152 moves the support 14 downwards and the rubber 142 is not deformed so that there is no contact between the rubber 142 and the board 16. Finally, FIG. 7 reveals the present invention has superior stability and a linear input-output relation that are evidences of a satisfactory performance.

Although the preferred embodiment has been described to illustrate the present invention, it is apparent that changes and modifications in the specifically described embodiment can be carried out without departing from the scope of the present invention. Such modifications and changes should be considered within the scope of the present invention limited by the appended claims.

What is claimed is:

1. A digital pressure sensitive pen comprising:
   a pen core support having one end formed with a polygonal notch;
   a writing pen core extending through a coil and a clamp casing into said pen core support, said writing pen core being secured in said polygonal notch;
   a conductible rubber;
   a circuit board having a spiral circuit printed on one side thereof;
   an elastic element;
   a fixing casing inside which said conductible rubber, said circuit board, and said elastic element are placed, said fixing casing having an extended plate; and
   a processing board placed on said ex tended plate for converting resistance value of said spiral circuit to voltage.

2. The pressure sensitive pen as claimed in claim 1, wherein said clamp casing has a first end formed with a notch for placing said coil and a second end formed with two clamping hooks.

3. The pressure sensitive pen as claimed in claim 1, wherein said elastic element is placed between said pen core support and said fixing casing for moving said conductible rubber to an initial position when said writing pen core is not pushed.

4. A digital pressure sensitive pen comprising:
   a writing pen core extending through a coil and a clamp casing into a pen core support;
   a circuit board having a spiral circuit printed on one side thereof;
   a conductible rubber placed next to said spiral circuit for obtaining different resistance values of said spiral circuit when said conductible rubber is pushed against said circuit board;
   an elastic element;
   a fixing casing inside which said conductible rubber, said circuit board, and said elastic element are placed; and
   a processing board for processing different resistance values of said spiral circuit to present different width of lines.

5. The pressure sensitive pen as claimed in claim 4, wherein said pen core support has one end formed with a polygonal notch for securing said writing pen core.

6. The pressure sensitive pen as claimed in claim 4, wherein said fixing case has one end formed with an extended plate for placing said processing board.

7. The pressure sensitive pen as claimed in claim 4, wherein said clamp casing has a first end formed with a notch for placing said coil and a second end formed with two clamping hooks.

8. The pressure sensitive pen as claimed in claim 4, wherein said elastic element is placed between said pen core support and said fixing casing for moving said conductible rubber to an initial position when said writing pen core is not pushed.

* * * * *